(12) United States Patent
Patrick et al.

(10) Patent No.: US 6,199,831 B1
(45) Date of Patent: Mar. 13, 2001

(54) NON-ELECTRIC PERIMETER FENCE

(76) Inventors: Paul H. Patrick; Scott Poulton, both of 800 Kipling Avenue, Toronto, Ontario (CA), M8Z 6C4

( * ) Notice: Subject to any disclaimer, the term of this patent is extended or adjusted under 35 U.S.C. 154(b) by 0 days.

(21) Appl. No.: 09/342,927

(22) Filed: Jun. 30, 1999

(51) Int. Cl.$^7$ ................................................ E04H 17/00
(52) U.S. Cl. ................................................ 256/11; 256/25
(58) Field of Search ....................... 256/11, 13.1, 12, 256/33, 3, 4, 25, 26, 27, 1; 119/477, 532, 502

(56) References Cited

U.S. PATENT DOCUMENTS

| 321,171 | 6/1885 | Archibald . | |
|---|---|---|---|
| 504,936 | 9/1893 | Niles . | |
| 1,565,431 | * 12/1925 | Fairchild et al. | 256/11 |
| 1,800,116 | * 4/1931 | Thom | 256/3 |
| 1,839,239 | * 1/1932 | Mahoney | 256/3 |
| 3,017,860 | * 1/1962 | Wilson | 256/25 X |
| 3,806,095 | * 4/1974 | Ford | 256/11 |
| 4,072,295 | * 2/1978 | Roberts | 256/26 |
| 4,361,313 | * 11/1982 | Russell | 256/13.1 |
| 4,673,166 | * 6/1987 | MacDougall | 256/1 X |
| 4,685,656 | * 8/1987 | Lee et al. | 256/13.1 |
| 4,896,864 | * 1/1990 | Nusbaum | 256/1 X |
| 5,040,772 | * 8/1991 | Greene | 256/12 X |
| 5,143,354 | 9/1992 | Nolan . | |
| 5,267,724 | 12/1993 | Heath et al. . | |
| 5,944,114 | * 8/1999 | Farley | 256/26 X |
| 6,113,076 | * 9/2000 | Hancock-Bogese et al. | 256/1 |

* cited by examiner

*Primary Examiner*—Lynne H. Browne
*Assistant Examiner*—David E. Bochna
(74) *Attorney, Agent, or Firm*—Ridout & Maybee

(57) ABSTRACT

A non-electric perimeter fence to prevent animals from entering a restricted area comprises a vertical barrier member extending to a predetermined height above ground level and an angled barrier member extending upwardly and outwardly from the vertical member relative to the restricted area. The vertical member may comprise a conventional chain link fence and the angled member is preferably made of a sheet material. The surface of the angled member which is presented to an animal attempting to climb over the fence is preferably smooth and free of protrusions which could assist the animal in climbing the fence. Preferably, the height of the angled member is sufficient to prevent an animal such as an adult raccoon from reaching over its upper edge.

20 Claims, 5 Drawing Sheets

NON-ELECTRIC PERIMETER FENCE

FIELD OF THE INVENTION

The present invention relates to perimeter fences for keeping selected animals from entering an enclosed area, and specifically relates to non-electric perimeter fences which prevent ground-dwelling animals from entering an enclosed area.

BACKGROUND OF THE INVENTION

Electric facilities such as transformer substations and distribution stations pose a potential hazard to both the public and to wildlife. Although such facilities are typically enclosed, wild animals have been known to gain entrance to such enclosures and short circuit a power line, thereby causing a power outage and also damaging equipment.

Chain link fences have been used to isolate the public and, to some extent, wildlife from distribution stations and transformer substations. However, chain link fences have not proven effective in preventing the entry of small animals into such facilities. In particular, small animals such as squirrels and raccoons are able to climb over chain link fences.

Occasionally, electrified fences have been used to keep animals out of hazardous areas. These electric fences generally consist of a chain link fence having adjacent its top a bare electrically conductive element, such as a wire or a metal bar. The conductive element is electrically coupled to a charging device. However, to protect the public as well as wildlife from death or injury due to electric shock, electrified fences typically produce an electric shock which startles and causes discomfort to an animal climbing the fence, but does not cause permanent or serious injury to the animal. This may be problematic when one is attempting to exclude certain animals such as raccoons from entering a restricted area. Raccoons have been observed to easily climb over some types of electrified fences despite the fact that they will typically absorb multiple shocks in doing so.

Other disadvantages of electrified fences include the need for a power supply and relatively frequent maintenance and/or a monitoring system to ensure proper operation of the fence. Therefore, electrified fences are considerably more expensive to construct and maintain than comparable non-electric fences.

Therefore, presently used fences for excluding animals from restricted areas such as transformer stations and distribution stations are not completely effective. There remains a need for an effective and low cost fence which effectively prevents small animals such as squirrels and raccoons from entering enclosed areas such as electrical distribution stations.

SUMMARY OF THE INVENTION

The present invention provides a non-electric perimeter fence which is effective for keeping selected animals out of an enclosed area, and is particularly effective for excluding small climbing animals, such as squirrels and raccoons, from entering an enclosed area. Since the fence is non-electric, it does not pose a hazard to humans or wildlife, and requires much less maintenance than conventional electrified fences.

The non-electric perimeter fence according to the present invention comprises a vertical barrier member extending upward from ground level and an upper, angled barrier member which extends at an angle from the vertical barrier member away from the enclosure. The vertical barrier member may be of conventional construction, and may, for example, be a conventional chain link fence. The angled portion is preferably made of a flat, sheet material and is of sufficient height that an animal able to climb the lower portion of the fence will not be able to reach backward and upward to the edge of the angled portion, and will therefore be unable to climb over the fence.

Accordingly, in one aspect, the present invention provides a non-electric perimeter fence adapted to enclose an area and to keep selected animals from entering said enclosed area, said fence comprising: an elongate, vertical barrier member extending lengthwise around an outer perimeter of said enclosed area and extending upwardly from ground level to a predetermined height above ground level, said height being sufficient to prevent said selected animals from jumping over said fence; a plurality of vertical support members for supporting said vertical barrier member; an elongate angled barrier member extending lengthwise along substantially the entire length of the vertical barrier member, said angled barrier member projecting upwardly from said vertical barrier member at an angle to the vertical and comprising a first surface facing upwardly and inwardly relative to said enclosed area and a second surface facing downwardly and outwardly relative to said enclosed area, said surfaces meeting at a lower edge extending along said vertical barrier member in close relation thereto and at an upper edge remote from the vertical barrier member, wherein said second surface is substantially smooth and flat from the bottom edge to the top edge and a distance from the bottom edge to the top edge being sufficient to prevent said selected animals from reaching from the bottom edge to the top edge of the angled barrier member; and a plurality of angled support members for supporting the angled barrier member, said angled support members being rigidly secured to the first surface of the angled barrier member and maintaining the position of the angled barrier member relative to the vertical barrier member.

BRIEF DESCRIPTION OF THE DRAWINGS

The invention will now be more fully described, by way of example only, with reference to the accompanying drawings, in which.

DETAILED DESCRIPTION OF PREFERRED EMBODIMENTS

The drawings illustrate preferred embodiments of the non-electric perimeter fence according to the present invention, which is adapted to prevent selected animals from entering an enclosed area. These animals are preferably small, ground-dwelling animals such as raccoons, squirrels, skunks, rabbits, cats, dogs, etc. More preferably, the fence is constructed to prevent access to an enclosed area by small, ground-dwelling animals which are capable of climbing conventional fences, such as raccoons and squirrels.

Figure 1:
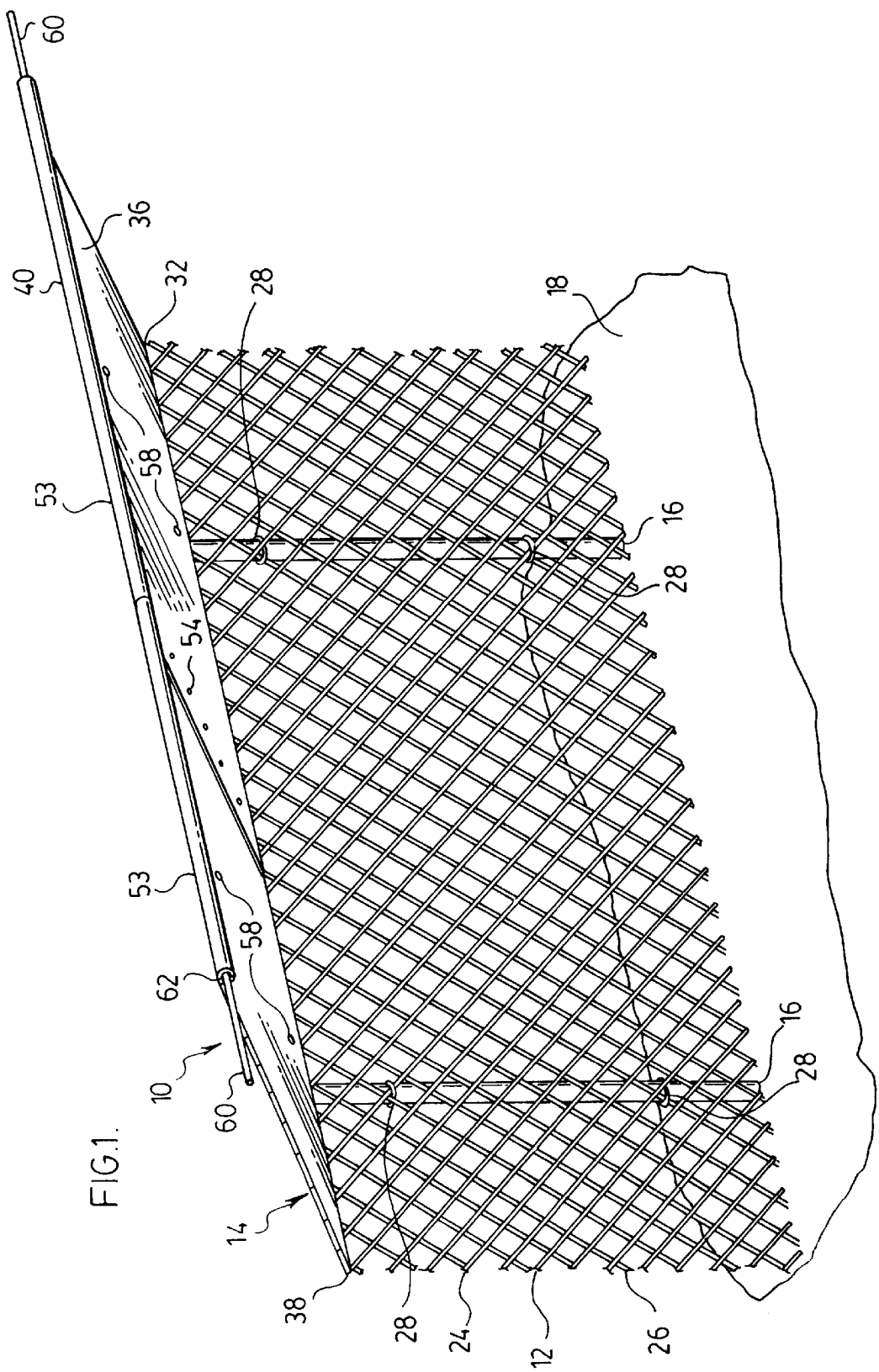
FIG. 1 is a perspective view of a segment of non-electric perimeter fence according to a first preferred embodiment of the present invention, the view of FIG. 1 being taken from outside an area enclosed by the fence.

FIG. 1 illustrates a short segment of a fence 10 according to a preferred embodiment of the present invention. It is to be appreciated that fence 10 preferably completely surrounds and encloses a restricted area, such as an electrical transformer station or distribution station, preferably extending along substantially the entire outer perimeter of the enclosed area with provision being made for a gate so that personnel may enter the area when desired. The gate is preferably of similar construction to the remainder of the fence to prevent animals from climbing over the gate.

As shown in the drawings, the fence 10 comprises an elongate, vertical barrier member 12, an angled barrier member 14 and a plurality of support posts 16.

Figure 3:
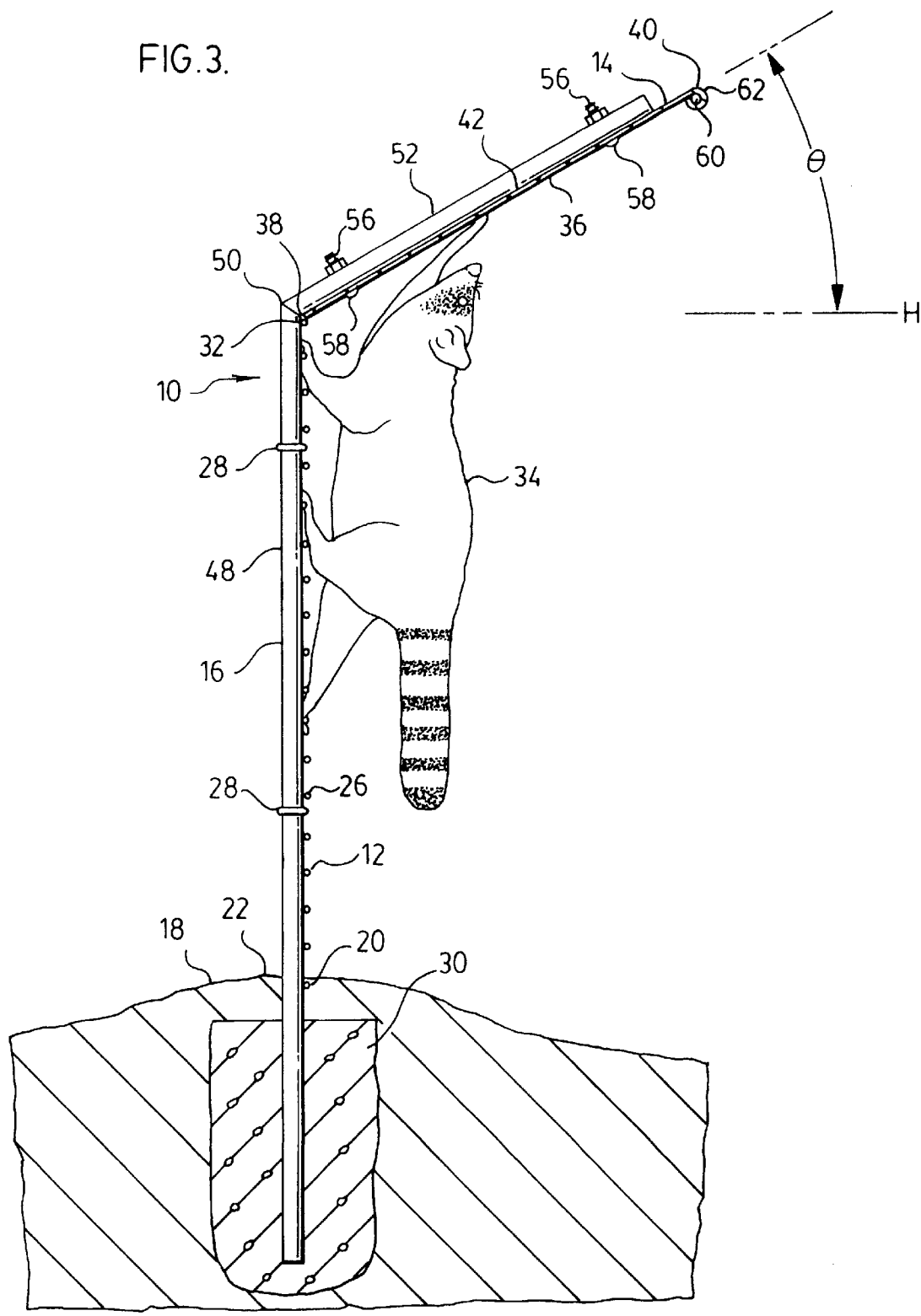
FIG. 3 is a cross-sectional view taken along line 3–3' of FIG. 2, and illustrates a raccoon attempting to climb the fence.

The vertical barrier member 12 is elongate and extends in its lengthwise direction around substantially the entire outer perimeter of the enclosed area. It will be appreciated that the vertical barrier member 12 may be comprised of one or more segments joined together end to end. The vertical barrier member extends upwardly from ground level 18 to a predetermined height, preferably at least about 36 inches above ground level 18. In addition, as shown in FIG. 3, the bottom 20 of vertical member 12 is either at or below ground level 18, in order to prevent animals from burrowing under the bottom 20 of vertical member 12. It may be preferred, as shown in FIG. 3, to form a mound 22 along the length of fence 10 to raise ground level 18 to a level above the bottom 20 of the vertical member 12 of fence 10.

In the most preferred embodiments of the present invention, the vertical barrier member 12 comprises a conventional chain link screen 24 comprised of a plurality of crisscrossing, interwoven wires 26. The wire chain link screen 24 is suspended from support posts 16 in a known manner, for example by wire ties 28, and is tensioned to maintain its structure. The support posts 16 are preferably anchored to the ground by concrete backfills 30, as shown in FIG. 3.

In some preferred embodiments of the invention, the top 32 of vertical barrier member is provided with a conventional horizontal support post (not shown) to thereby provide greater support to the chain link screen 26.

The angled barrier member 14 extends lengthwise along substantially the entire length of the vertical barrier member 12, and therefore also extends along substantially the entire outer perimeter of the enclosed area. As most clearly shown in FIG. 3, the angled barrier member 14 projects upwardly from the vertical barrier member 12 at an angle θ to a horizontal axis H. The inventors have found an angle θ of at least about 30 degrees to the horizontal to be particularly effective.

The angled barrier member 14 projects upwardly and outwardly toward the outside of the enclosed area. Therefore, as shown in FIG. 3, an animal such as raccoon 34, having climbed to the top 32 of vertical barrier member 12, encounters a downwardly facing surface 36 of angled barrier member 14. The downwardly facing surface 36 is substantially smooth and flat from the bottom edge 38 of the angled barrier member 14 to the top edge 40. In other words, there are no protrusions on bottom surface animal 34 which could be grasped by animal 34 which would assist it in climbing along surface 36 to the top edge 40 of the angled barrier member 14.

The angled barrier member 14 preferably also has an upwardly facing surface 42 which is attached to support members 16. By attaching support members 16 to the upwardly facing surface 42 of angled barrier member 14, animals attempting to climb fence 10 will not be able to use the support members 16 to assist them in climbing to the top edge 40 of angled barrier member 14.

As shown in the drawings, the lower edge 38 of angled barrier member 14 extends upwardly and away from the chain link screen 24, and is in close relation thereto, thereby avoiding the formation of a gap between vertical member 12 and angled member 14 through which an animal could pass. Although not shown in the drawings, and not necessary if sufficient tension is applied to the chain link screen 24, the lower edge 38 of angled barrier member 14 and the top 32 of vertical barrier member 12 may preferably be joined to one another to ensure that no gap will be formed. For example, small holes could be formed in angled barrier member 14 adjacent its lower edge 38, with wire ties being passed through these holes and attached to the chain link screen 24.

The distance from the bottom edge 38 to the top edge 40 of angled barrier member 14 is preferably sufficient to prevent an animal such as raccoon 34 from positioning itself at the top 32 of vertical barrier member 12 as shown in FIG. 3 and reaching upwardly to the top edge 40 of the angled barrier member 14. To prevent raccoons from climbing fence 10, the distance between the bottom and top edges 38 and 40 is preferably greater than 22 inches, which the inventors have observed to be the maximum reach of an adult raccoon. In order to ensure that the fence will exclude all raccoons, the distance between the bottom edge 38 and top edge 40 is more preferably no less than 25 inches.

The vertical barrier member 12 and the angled barrier member 14 may, in some preferred embodiments, be supported by separate support members. For example, the vertical barrier member 12 comprised of chain link screen 24 could be supported by support posts typically used with that type of fence. In such an embodiment, separate angled support members could be attached either to a vertical support post or horizontal top rail in order to provide support for the angled barrier member 14. Such a construction would allow the angled barrier member 14 to be added to an existing chain link fence.

However, in the preferred embodiments shown in the drawings, for economy in constructing new fences, angled support posts 16 are preferably provided to support both the vertical barrier member 12 and the angled barrier member 14. To this end, the support post 16 comprises a vertical portion 48 which is adapted to extend from below ground level 18 to the top 32 of vertical barrier member 12. At the point where the vertical barrier member 12 and angled barrier member 14 meet, a bend 50 is formed in the support post 16, preferably forming an angle of at least about 30 degrees to the horizontal as discussed above. An angled portion 52 of support post 16 extends upwardly at an angle from bend 50, and preferably extends from the bottom edge 38 of angled barrier member 14 to a point proximate the upper edge 40 thereof Preferably, as shown in FIG. 3, the angled portion 52 of support post 16 is rigidly secured to the angled barrier member 14 by mechanical fasteners such as bolts 56. In order to avoid protrusions on the downward facing surface 36 of angled barrier member 14, the heads 58 of bolts 56 are preferably rounded.

Figure 2:
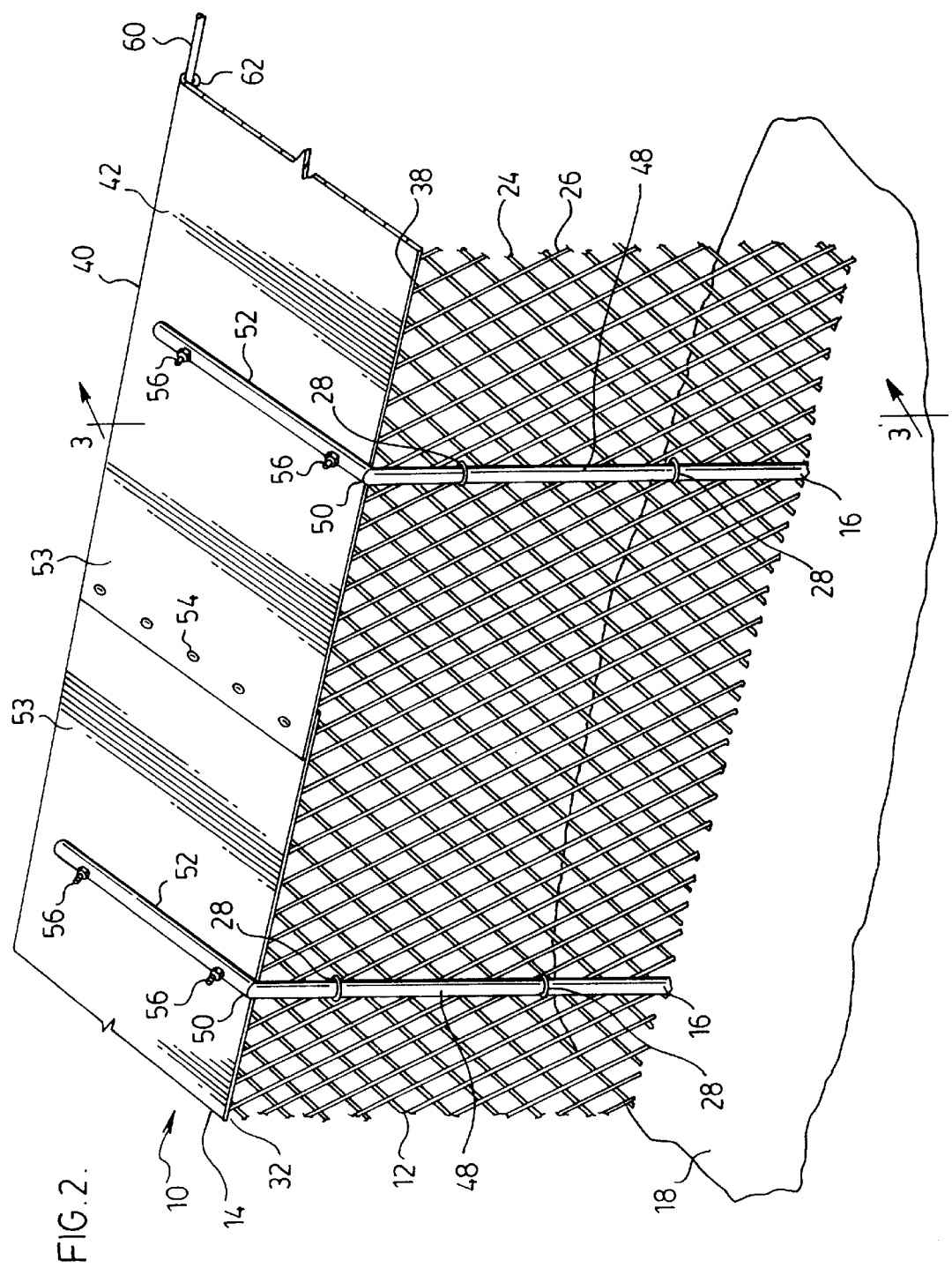
FIG. 2 is a perspective view of the fence of FIG. 1 taken from inside the area enclosed by the fence.

It will be appreciated that the fence according to the present invention will typically be comprised of a plurality of substantially straight segments, these segments being joined to one another at their corners to form a continuous enclosure around the enclosed area. Each of these segments comprises a substantially straight, continuous length of fence 10 comprised of the vertical barrier member 12 and angled barrier member 14. In order to form a straight, continuous length of angled barrier member 14, it may be preferred to construct the angled barrier member 14 on site from one or more rectangular sheets 53 of rigid material, such as sheet metal or a rigid sheet plastic. Preferably, the edges of these sheets 53 would be attached to one another by screws or rivets 54, as shown in FIG. 2, with the edges of the sheets 53 overlapping so that no gap exists along the length of the straight segment of angled barrier member 14.

It may also be preferred that the upper edge 40 of the angled barrier member 14 is provided with a support member which extends along the length of the barrier member 14. In the first preferred embodiment of the invention, the elongate support member comprises a tensioned cable 60 extending continuously along the upper edge 40 of angled barrier member 14. Preferably, cable 60 extends around substantially the entire perimeter of the fence 10, and prevents the angled barrier member 14 from being damaged by animals attempting to climb the fence either from the inside or the outside.

Preferably, the tensioned cable 60 is housed in a tubular passage 62 formed along the upper edge 40 of the angled barrier member 14. In the preferred embodiment of the invention shown in the drawings, in which the angled support member 14 is made of sheet metal, the tubular passage 62 is formed merely by rolling over the edge of the sheet metal from which the angled barrier member 14 is formed.

Figure 4:
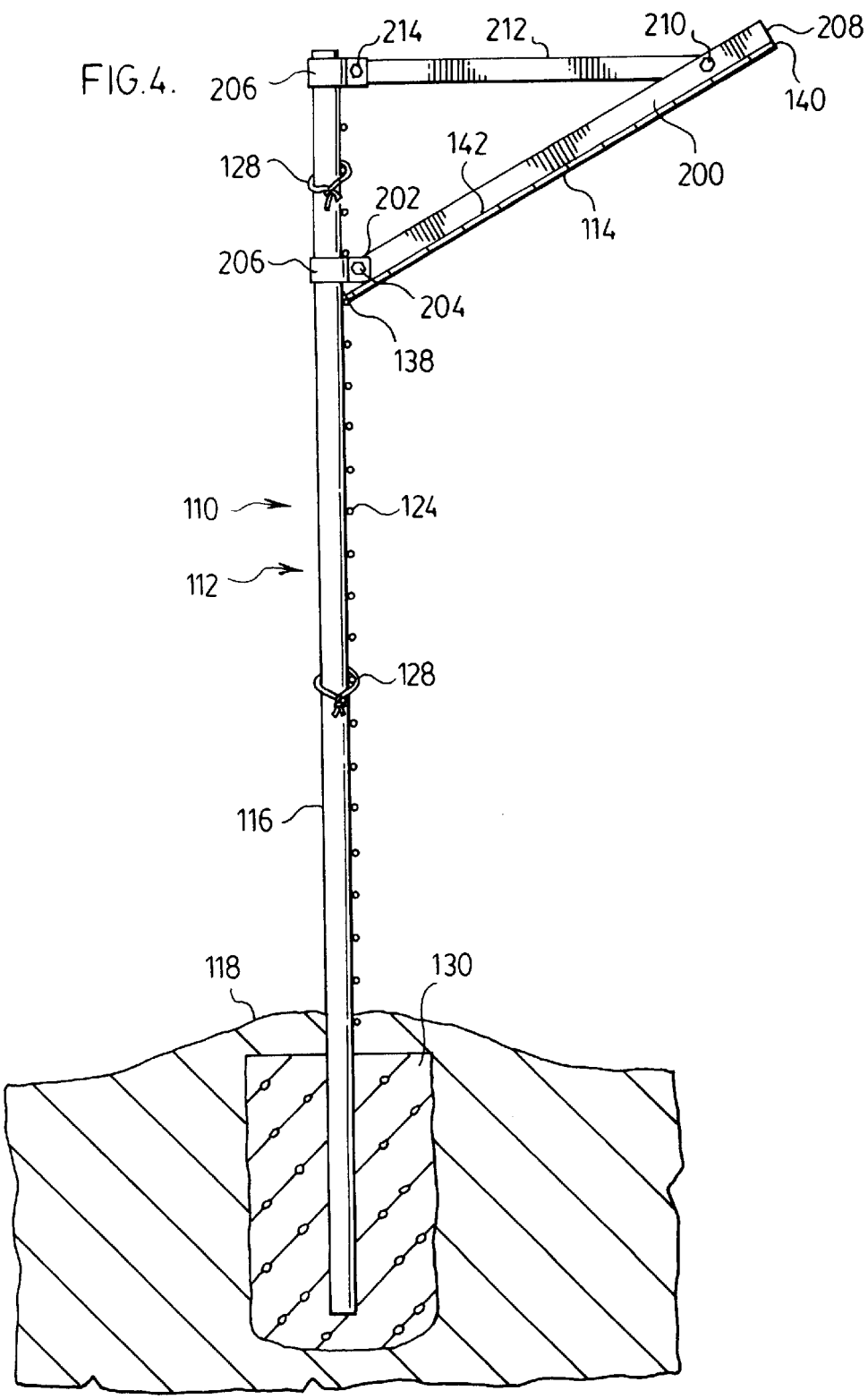
FIG. 4 is a cross-sectional view of a segment of non-electric perimeter fence according to a second preferred embodiment of the present invention.

FIG. 4 illustrates a non-electric perimeter fence 110 according to a second preferred embodiment of the present invention. As in fence 10 discussed above, fence 110 comprises an elongate, vertical barrier member 112, an angled barrier member 114 and a plurality of support posts 116, of which only one is shown in FIG. 4. Support posts 116 are preferably anchored to the ground by concrete backfills 130. Vertical barrier member 112 preferably extends from ground level 118 to a height of at least about 45 inches, more preferably at least about 48 inches, and is comprised of a conventional chain link screen 124 which is attached to support posts 116 by wire ties 128.

As in the first preferred embodiment, angled barrier member 114 of fence 110 extends lengthwise along substantially the entire length of vertical barrier member 112, and projects upwardly from vertical barrier member 112 at an angle of at least about 30 degrees to the horizontal. The distance between the lower and upper edges 138 and 140 of angled barrier member 114 is preferably the same as that disclosed above for the first preferred embodiment.

An angled support member 200 is provided on the upwardly facing surface 142 of angled barrier member 114, and preferably extends from the bottom edge 138 to the top edge 140 thereof. Angled support member 200 preferably comprises a rigid metal bar, tube or angle iron which is rigidly connected to the upwardly facing surface 142 for example by welding or mechanical fasteners such as bolts of screws. A lower end 202 of angled support member 200 is secured to support post 116 intermediate its upper and lower ends, preferably at least about 36 inches above ground level 118. Preferably, lower end 202 of angled support member 200 is secured by bolt 204 to a conventional metal clamp 206 which extends around and clamps support post 116.

Angled support member 200 is secured proximate its upper end 208, for example by bolt 210, to one end of a horizontal support member 212, which is preferably also comprised of a rigid metal bar, tube or angle iron. The opposite end of horizontal support member 212 is secured to post 16 proximate its upper end, preferably also by a clamp 206 secured to horizontal member 212 by a bolt 214.

Figure 5:
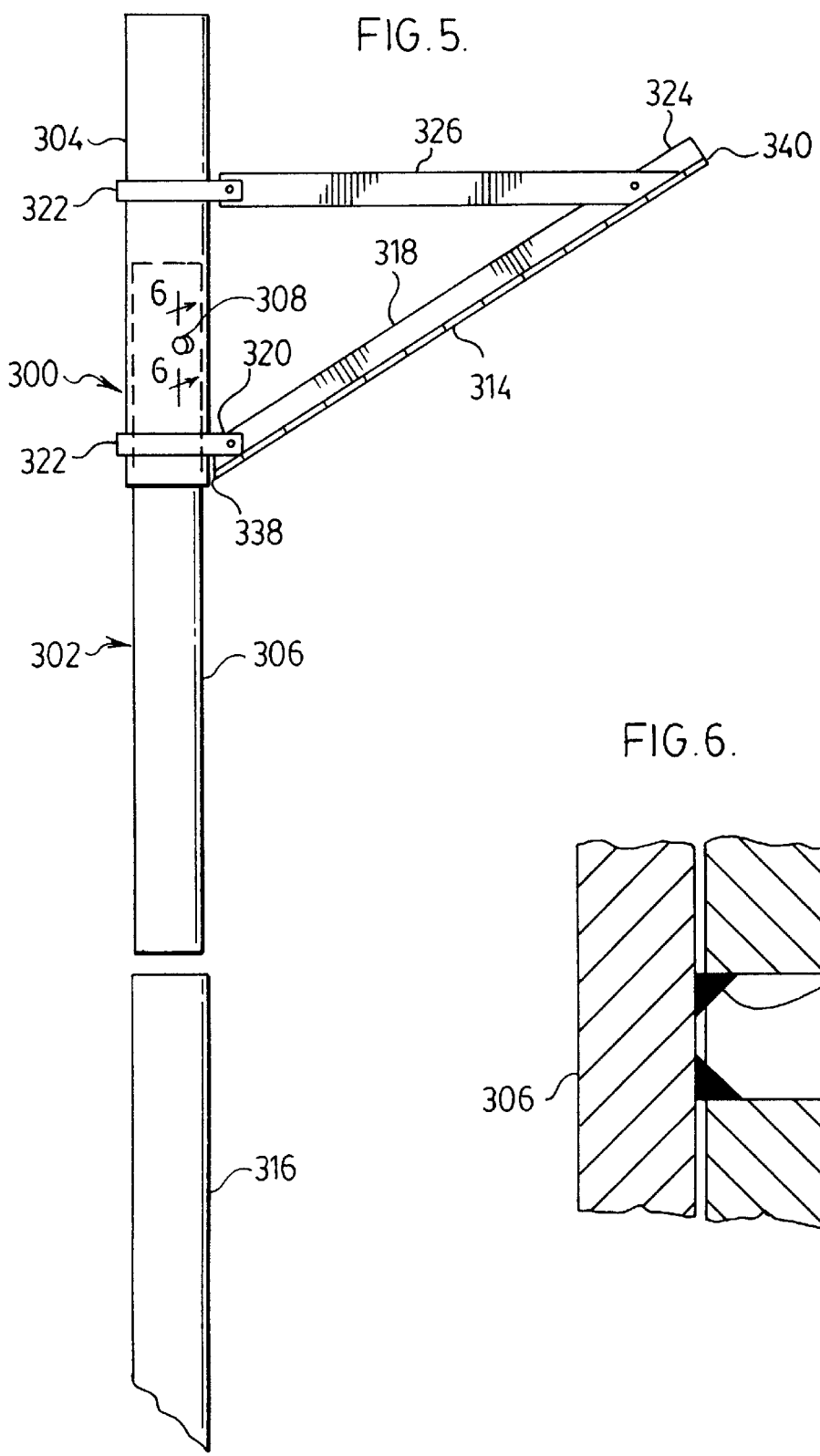
FIG. 5 is a side elevation of a retrofit fence extension according to a third preferred embodiment of the present invention.

FIG. 5 illustrates a preferred manner in which an angled barrier member according to the present invention can be added as a retrofit to an existing fence. FIG. 5 shows a support post 316 of a fence which is preferably identical in construction to the vertical barrier member 112 shown in FIG. 4, also including a chain link screen which has been omitted from FIG. 5 for clarity. Fitted into the upper end of support post 316 is a retrofit extension 300 according to the third embodiment of the present invention. Retrofit extension 300 comprises a tubular, vertical support member 302 which may either be made from metal or rigid plastic and comprises an upper section 304 of a first diameter and a lower section 306 of a second diameter. The total length of support member is about 48 inches, with upper section having a length of about 24 inches. Preferably, the upper section 304 is of greater diameter than the lower section 306, and is more preferably of the same diameter as vertical support member 316, for example having an outside diameter of about 3.5 inches. The lower section 306 is of a diameter which allows it to slide into and snugly fit inside upper section 304, the outside diameter of lower section 306 preferably being about 3 inches. Lower section 306 preferably has a total length of about 36 inches, of which about 12 inches is received inside upper section 304 and 24 inches projects downwardly from the lower end of upper section 304.

Figure 6:
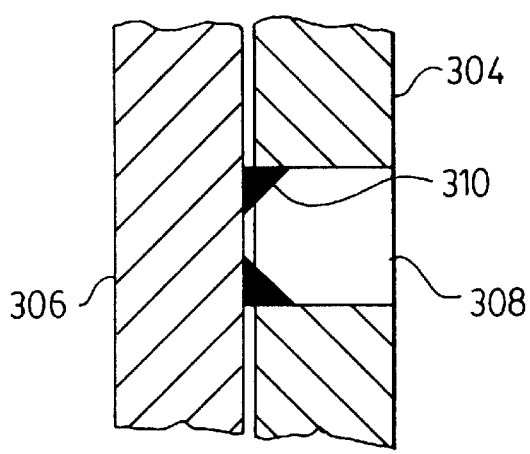
FIG. 6 is an enlarged cross-sectional view along the line 6–6' in FIG. 5.

It may be preferred that upper and lower sections 304 and 306 of support member 302 are comprised of separate sections of pipe which are secured together in the configuration shown in FIGS. 5 and 6. For example, where sections 304 and 306 are made of metal, a hole 308 having a diameter of about ½ inch is formed through upper section 304 approximately 6 inches above its lower end. A weld 310 is then formed inside hole 308, thereby joining together the upper and lower sections 304 and 306 as shown in FIG. 6. Although the drawings show a preferred embodiment in which the upper and lower sections 304 and 306 of support member 302 are formed from separate pipe sections, it may be preferred that sections 304 and 306 be integrally formed from metal or plastic.

Secured to the upper section 304 of support member 302 is an angled barrier member 314 which is preferably of the same dimensions as barrier members 14 and 114 discussed above. An angled support member 318 extends from the bottom edge 338 to the top edge 340 of angled barrier member 314 and is preferably a tube, flat metal bar or angle iron which is either welded to barrier member 314 or secured to barrier member 314 by welding or by mechanical fasteners such as bolts or screws. A lower end 320 of angled support member 318 is preferably bolted to a clamp 322 which is tightly secured around upper section 304 of vertical support member 302 intermediate its upper and lower ends. An upper end 324 of angled support member 318 is bolted to one end of a horizontal support member 326, which preferably comprises a tube, a metal bar or an angle iron, the other end of which is bolted to a clamp 322 tightly secured around upper section 304 proximate its lower end.

Although the fences according to the present invention have been disclosed as having a preferred height of about 36 inches, it will be appreciated that the present invention is applicable to fences of various heights. In particular, in embodiments of the invention which comprise retrofits to existing fences, it is to be appreciated that the height of the existing fence is relatively unimportant, and may typically be in the range of 6 to 8 feet.

Although the invention has been described by reference to certain preferred embodiments, it is to be appreciated that it is not limited thereto. Rather, the present invention includes within its scope all embodiments which may fall within the scope of the following claims.

What is claimed is:

1. A non-electric perimeter fence adapted to enclose an area and to keep selected animals from entering said enclosed area, said fence comprising:

an elongate, vertical barrier member extending lengthwise around an outer perimeter of said enclosed area and extending upwardly from ground level to a predetermined height above ground level, said height being sufficient to prevent said selected animals from jumping over said fence;

a plurality of vertical support members for supporting said vertical barrier member;

an elongate angled barrier member extending lengthwise along substantially the entire length of the vertical barrier member, said angled barrier member projecting upwardly from said vertical barrier member at an angle to the horizontal and comprising a first surface facing upwardly and inwardly relative to said enclosed area and a second surface facing downwardly and outwardly relative to said enclosed area, said surfaces meeting at a lower edge extending along said vertical barrier member in close relation thereto and at an upper edge remote from the vertical barrier member, wherein said second surface is substantially smooth and flat from the bottom edge to the top edge and a distance from the bottom edge to the top edge being sufficient to prevent said selected animals from reaching from the bottom edge to the top edge of the angled barrier member; and a plurality of angled support members for supporting the angled barrier member, said angled support members being rigidly secured to the first surface of the angled barrier member and maintaining the position of the angled barrier member relative to the vertical barrier member.

2. The non-electric perimeter fence of claim 1, wherein said vertical barrier member is comprised of a chain link fabric.

3. The non-electric perimeter fence of claim 1, wherein said angled barrier member extends from the top of the vertical barrier member, and wherein the vertical and angled support members are unitarily formed into a combined support member having a lower vertical portion which is anchored in the ground and extends upwardly to the top of the vertical barrier member, and an upper vertical portion extending from said vertical portion at said angle, and extends from the lower edge of the angled barrier member to a point proximate the upper edge of the angled barrier member.

4. The non-electric perimeter fence of claim 1, wherein said fence is comprised of a plurality of substantially straight segments, each of said segments comprising a substantially continuous length of said vertical barrier member and said angled barrier member, and wherein said angled barrier member is comprised of one or more rectangular sheets of a rigid material.

5. The non-electric perimeter fence of claim 4, wherein said continuous length of said angled barrier member is comprised of a plurality of said rectangular sheets having overlapping edges.

6. The non-electric perimeter fence of claim 1, wherein said angled barrier member is comprised of sheet metal or rigid plastic sheet material.

7. The non-electric perimeter fence of claim 1, additionally comprising an elongate support member mounted to and extending along the upper edge of the angled barrier member.

8. The non-electric perimeter fence of claim 7, wherein said elongate support member comprises a metallic cable.

9. The non-electric perimeter fence of claim 8, wherein said upper edge of said angled barrier member is tubular and is adapted to house said cable.

10. The non-electric perimeter fence of claim 9, wherein said angled barrier member is comprised of sheet metal and said tubular upper edge is formed by rolling over an edge of said sheet metal.

11. The non-electric perimeter fence of claim 1, wherein a vertical distance from ground level to the lower edge of the angled barrier member is at least 36 inches.

12. The non-electric perimeter fence of claim 1, wherein the distance from the bottom edge to the top edge of the angled barrier member is at least about 22 inches.

13. The non-electric perimeter fence of claim 12, wherein the distance from the bottom edge to the top edge of the angled barrier member is at least about 25 inches.

14. The non-electric perimeter fence of claim 1, wherein the angle of said angled barrier member is at least about 30 degrees from the horizontal.

15. A fence extension to be attached to an existing fence and thereby provide a non-electric perimeter fence adapted to enclose an area and to keep selected animals from entering said enclosed area, wherein said existing fence comprises an elongate, vertical barrier member extending lengthwise around an outer perimeter of said enclosed area and extending upwardly from ground level to a predetermined height above ground level, and a plurality of vertical support members for supporting said vertical barrier member, said vertical support members having an open upper end and an interior cavity extending downwardly from said upper end; said fence extension comprising:

a plurality of elongate, vertical extension members, each having an upper section of a first diameter and a lower section of a second diameter, the second diameter being such that the lower section is adapted to fit snugly into the hollow upper end of a vertical support member of the existing fence, with a transition between the upper and lower sections being received at the upper end of the vertical support member of the existing fence, the extension member thereby forming a vertical extension of the vertical support member;

an elongate angled barrier member extending lengthwise along substantially the entire length of the fence extension, said angled barrier being attached to said vertical extension members at an angle thereto and comprising a first surface facing toward said vertical extension members and a second surface facing away from said vertical extension member, said surfaces meeting at a bottom edge in close relation to the transition between the upper section and the lower section of the vertical extension member, and a top edge which is remote from the upper section of the vertical extension member, wherein said second surface is substantially smooth and flat from the bottom edge to the top edge and a distance from the bottom edge to the top edge is sufficient to prevent said selected animals from reaching from the bottom edge to the top edge of the angled barrier member;

a plurality of angled support members for supporting the angled barrier member, said angled support members being rigidly secured to the first surface of the angled barrier member and maintaining the position of the angled barrier member relative to the vertical barrier member, said angled support members having a first end proximate the bottom edge of the angled barrier member and a second end proximate the top edge of the angled barrier member, the bottom edge being secured to the upper section of the vertical extension member at a connection point proximate the transition between the upper and lower sections; and a plurality of horizontal support members, each of which extends at a right angle from one of the vertical extension members and has a first end connected to the upper section of the vertical extension member at a point located intermediate the connection point of the first end of the angled support member and an upper end of the vertical extension member, and a second end connected to a point proximate the top edge of the angled barrier member.

16. The fence extension of claim 15, wherein a spacing between said vertical extension members of the fence extension is the same as a spacing between the vertical support members of the existing fence.

17. The fence extension of claim 15, wherein the angled barrier member is comprised of sheet metal or rigid plastic material.

18. The fence extension of claim 15, wherein the distance from the bottom edge to the top edge of the barrier member is at least about 22 inches.

19. The fence extension of claim 15, wherein the distance from the bottom edge to the top edge of the barrier member is at least about 25 inches.

20. The fence extension of claim 15, wherein the angle of said angled barrier member is no more than about 60 degrees from the vertical extension member.

* * * * *